US012675082B2

(12) United States Patent
Kubosawa et al.

(10) Patent No.: US 12,675,082 B2
(45) Date of Patent: Jul. 7, 2026

(54) TRAINING DEVICE, CONTROL SYSTEM, TRAINING METHOD, AND RECORDING MEDIUM

(71) Applicant: NEC Corporation, Tokyo (JP)

(72) Inventors: Shumpei Kubosawa, Tokyo (JP); Takashi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 470 days.

(21) Appl. No.: 18/033,302

(22) PCT Filed: Nov. 10, 2020

(86) PCT No.: PCT/JP2020/041858
§ 371 (c)(1),
(2) Date: Apr. 21, 2023

(87) PCT Pub. No.: WO2022/101966
PCT Pub. Date: May 19, 2022

(65) Prior Publication Data
US 2023/0393537 A1      Dec. 7, 2023

(51) Int. Cl.
G05B 13/02          (2006.01)

(52) U.S. Cl.
CPC ................................ G05B 13/0265 (2013.01)

(58) Field of Classification Search
USPC .......................................................... 700/47
See application file for complete search history.

(56) References Cited

U.S. PATENT DOCUMENTS

| | | | |
|---|---|---|---|
| 2018/0261085 A1 | 9/2018 | Liu et al. | |
| 2020/0285204 A1* | 9/2020 | Iwane | ................... G06N 20/00 |
| 2021/0383269 A1* | 12/2021 | Zhou | ................... B60W 40/06 |
| 2023/0400821 A1* | 12/2023 | Sekiai | ................... G05B 23/02 |

FOREIGN PATENT DOCUMENTS

| | | | | |
|---|---|---|---|---|
| CN | 105404154 A | * | 3/2016 | |
| CN | 110119705 A | * | 8/2019 | |
| CN | 110347035 A | * | 10/2019 | |
| JP | H05-059372 U | | 8/1993 | |
| JP | H07-36505 A | * | 2/1995 | |
| JP | 2002-189502 A | | 7/2002 | |
| JP | 2008309671 A | * | 12/2008 | |

(Continued)

OTHER PUBLICATIONS

Samejima et al. "Adaptive internal state space construction method for reinforcement learning of a real-world agent", Elsevier, 1999, p. 1143-1155. (Year: 1999).*

(Continued)

*Primary Examiner* — Hien D Khuu

(74) *Attorney, Agent, or Firm* — Sughrue Mion, PLLC

(57)          ABSTRACT
A training device updates, among a plurality of models, a model for a region that includes a given sample based on the sample. The plurality of models are provided for each region obtained by dividing a state space that includes a sample indicates a state about a control object and the plurality of models represent an evaluation of an action of the control object in response to control over the control object. The training device evaluates an action of the control object in a given state, based on a model for a region that includes a sample indicating the state.

11 Claims, 8 Drawing Sheets

(56) References Cited

FOREIGN PATENT DOCUMENTS

| | | | |
|----|----------------|---|---------|
| JP | 2018-147489 A  |   | 9/2018  |
| JP | 2018-195089 A  |   | 12/2018 |
| JP | 2019-106049 A  |   | 6/2019  |
| KR | 20200068055 A  | * | 6/2020  |

OTHER PUBLICATIONS

Luo et al. "End-to-End Active Object Tracking and Its Real-World Deployment via Reinforcement Learning", IEEE, Jun. 2020, p. 1317-1332. (Year: 2020).*
International Search Report for PCT Application No. PCT/JP2020/041858, mailed on Feb. 2, 2021.

* cited by examiner

TRAINING DEVICE, CONTROL SYSTEM, TRAINING METHOD, AND RECORDING MEDIUM

This application is a National Stage Entry of PCT/JP2020/041858 filed on Nov. 10, 2020, the contents of all of which are incorporated herein by reference, in their entirety.

TECHNICAL FIELD

The present invention relates to a training device, a control system, a training method, and a recording medium.

BACKGROUND ART

Reinforcement learning is one type of machine training (for example, see Patent Document 1).

PRIOR ART DOCUMENTS

Patent Documents

Patent Document 1: Japanese Unexamined Patent Application, First Publication No. 2002-189502

SUMMARY OF THE INVENTION

Problems to be Solved by the Invention

When the environment changes greatly in reinforcement learning, it is conceivable that the training results in the past environment are forgotten by training according to the new environment. Even if a training result suitable for the past environment is obtained, if it is forgotten in the new environment, when the agent is again placed in the same environment as the past environment, the past training result cannot be used, and so the need for retraining will arise.

In contrast, it is preferable to be able to appropriately respond to changes in the environment.

One object of the present invention is to provide a training device, a control system, a training method, and a recording medium that can solve the above problem.

Means for Solving the Problem

According to the first example aspect of the present invention, a training device incudes: a model-setting means that updates, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and a training means that evaluates an action of the control object in a given state, based on a model for a region that includes a sample indicating the state.

According to the second example aspect of the present invention, a training device includes: a clustering means that determines a region that includes a given sample when there is a model that is provided in each of a plurality of regions obtained by dividing a state space that includes a sample indicating a state about a control object and that represents an evaluation of an action of the control object in response to control over the control object; and a training means that evaluates the action based on the sample and the model for the determined region.

According to the third example aspect of the present invention, a control system includes: a training device and a control object, the training device includes: a model-setting means that updates, among a plurality of models, a model for a region that includes a given sample based on the sample, the plurality of models being provided for each region obtained by dividing a state space that includes a sample indicates a state about the control object and the plurality of models representing an evaluation of an action of the control object in response to control over the control object; and a training means that evaluates an action of the control object in a given state, based on a model for a region that includes a sample indicating the state.

According to the fourth example aspect of the present invention, a control system includes: a training device and a control object, the training device includes: a clustering means that determines a region that includes a given sample when there is a model that is provided in each of a plurality of regions obtained by dividing a state space that includes a sample indicating a state about the control object and that represents an evaluation of an action of the control object in response to control over the control object; and a training means that evaluates the action based on the sample and the model for the determined region.

According to the fifth example aspect of the present invention, a training method includes: updating, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and evaluating an action of the control object in a given state, based on a model for a region that includes a sample indicating the state.

According to the sixth example aspect of the present invention, a training method includes: determining a region that includes a given sample when there are plurality of models that are respectively provided in a plurality of regions obtained by dividing a state space that includes a sample indicating a state about a control object and that represent an evaluation of an action of the control object in response to control over the control object; and evaluating the action based on the sample and the model for the determined region.

According to the seventh example aspect of the present invention, a recording medium records a program for causing a computer to execute: updating, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and evaluating an action of the control object in a given state, based on a model for a region that includes a sample indicating the state.

According to the eighth example aspect of the present invention, a recording medium records a program for causing a computer to execute: determining a region that includes a given sample when there are plurality of models that are respectively provided in a plurality of regions obtained by dividing a state space that includes a sample indicating a state about a control object and that represent an evaluation of an action of the control object in response to control over the control object; and evaluating the action based on the sample and the model for the determined region.

Effect of Invention

According to the above-described training device, control system, training method, and recording medium, it is possible to more appropriately cope with environmental changes in reinforcement learning.

EXAMPLE EMBODIMENT

Example embodiments of the present invention will be described below, but the following example embodiments shall not limit the invention according to the claims. Also, all combinations of features described in the example embodiments may not be essential for the solution of the invention.

Figure 1:
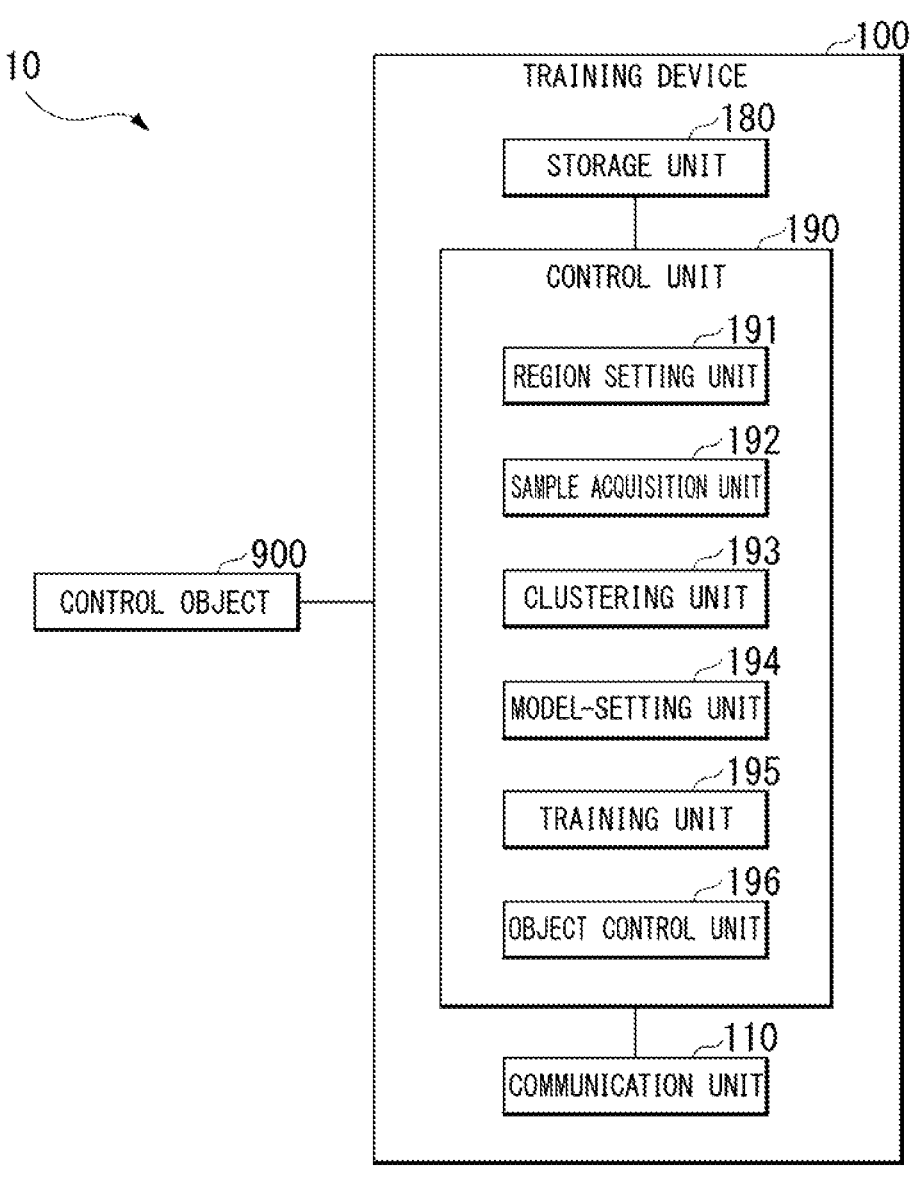
FIG. 1 is a schematic block diagram showing a configuration example of the control system according to the example embodiment.

FIG. 1 is a schematic block diagram showing a configuration example of the control system according to the example embodiment. With the configuration shown in FIG. 1, the control system 10 includes a training device 100 and a control object 900. The training device 100 includes a communication unit 110, a storage unit 180, and a control unit 190. The control unit 190 includes a region setting unit 191, a sample acquisition unit 192, a clustering unit 193, a model-setting unit 194, a training unit 195, and an object control unit 196.

The control system 10 performs learning of the control rule of the control object 900 by reinforcement learning, and controls the control object 900 based on the obtained control rule.

Reinforcement learning here means that, for example, performing learning of the policy such that the expected value of the cumulative reward becomes larger, in a framework in which an agent performs an action determined by applying a policy to the state observed by the agent, whereby the state transitions, and a reward is given according to the transition destination state. An agent may be observing a state. That is, the agent may obtain a state from the environment. Alternatively, an agent may obtain a state both from the agent itself and from the environment.

In the example of FIG. 1, the control object 900 corresponds to an example of an agent. The control rule of the control object 900 corresponds to the policy.

The control object 900 and the training device 100 may be configured as one device, or may be configured separately.

The training device 100 performs learning of the control rule of the control object 900 and controls the control object 900 according to the obtained control rule. For at least one of the policy function and the reward function, the training device 100 performs learning of the control rule of the control object 900 using a function configured by a model for each region into which the state space is divided (regions will be described later with reference to FIG. 2).

A state space is a collection of information representing the state of the control object 900. The state space may contain information representing an action for the control object 900 in a certain state.

A region represents a portion of the state space divided on a similarity basis. A region may partially overlap another region. Alternatively, none of the regions may overlap other regions, as described below with reference to FIG. 2. A process of division such that a part of a region overlaps with another region can be realized by a technique such as the k-nearest neighbor algorithm, for example.

Also, the degree of similarity may be measured by a distance as described later. Alternatively, the degree of similarity may be measured by an index representing the degree to which states are similar to each other, such as not satisfying the triangle inequality.

The model represents an evaluation of action (or motion, processing, etc.) for the control object 900. For example, when the state of the control object 900 is a certain state, when a certain action is performed on the control object 900, the value of the model represents the degree to which the action is suitable for the control object. In other words, the model can also be said to be a process of evaluating the suitability (or value, goodness, desirability, etc.) of an action performed on the control object 900 in a certain state.

A model for each region corresponds to a partial function for a policy function defined for each region, or a partial function for a reward function in which the reward function is defined for each region. A model for each region is also called a partial function model, or simply a model.

The training device 100 may be configured using a computer such as a personal computer (PC), a microcomputer, or a workstation (WS).

In reinforcement learning, it is conceivable that the input distribution of states changes, and the preferred policy also changes accordingly. For example, when reinforcement learning is applied to vehicle travel control, it is conceivable that preferable control differs between a state in which a road surface is dry and a state in which water has collected on a road surface due to sudden rain.

If the control device of this vehicle performs learning of driving control when the road surface is wet, and this affects the training results when the road surface is dry, it is conceivable that appropriate travel control cannot be performed when the rain stops and the road surface becomes dry again.

On the other hand, in the training device 100, as described above, at least one of the policy function and the reward function is composed of a partial function model for each region, with the partial function model being trained for each region. In the above example, when the training device 100 is used as the control device, due to the state where the road surface is dry and the state where the road surface is covered with water belonging to different regions, it is expected that training in the state with water collected on the road surface will not affect training in a state in which the road surface is dry. According to the training device 100, training in the state of the road surface being wet does not affect training in the state of the road surface being dry, whereby when the rain stops and the road surface becomes dry again, the same driving control as before the rain can be performed using the training results from the period before the rain.

Thus, in the training device 100, training in a new state does not affect training results in a different state, or the effect is small. As a result, when the training device 100 returns to a state similar to a state trained in the past, the training result can be used to perform the same processing as in the past.

The communication unit 110 communicates with other devices. For example, the communication unit 110 may communicate with the control object 900 to receive various pieces of information and transmit control signals.

The storage unit 180 stores various pieces of information. The storage unit 180 is configured using a storage device included in the training device 100.

The control unit 190 controls each unit of the training device 100 to perform various processes. The functions of the control unit 190 are executed by, for example, a CPU (Central Processing Unit) included in the training device 100 reading a program from the storage unit 180 and executing the program.

The region setting unit 191 sets regions in the state space. As noted above, a region here is each of the partitioned portions (i.e., partial spaces) of the state space.

The state space referred to here is a vector space representing the states acquired by the agent according to its actions. Also, each state acquired by the agent according to its actions is called a sample. The sample is denoted by $\xi$, and the position vector of the sample $\xi$ is denoted by $w_\xi$.

Not limited to the sample $\xi$, the position vector of the point p in the state space is denoted by $w_p$.

Figure 2:
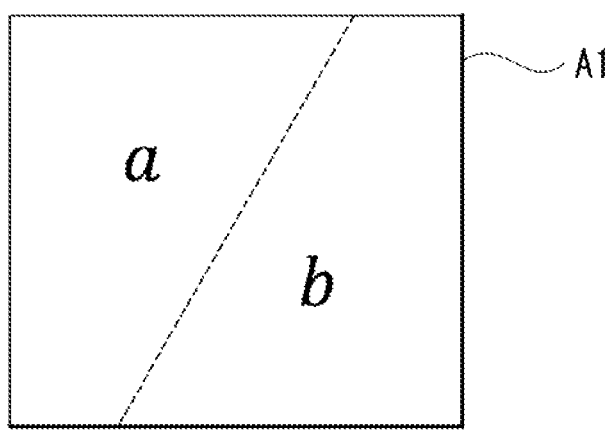
FIG. 2 is a diagram showing an example of a region set by the region setting unit according to the example embodiment.

FIG. 2 is a diagram showing an example of regions set by the region setting unit 191.

In the example of FIG. 2, the region setting unit 191 sets representative points a and b in the state space A1. A region is set by setting this representative point.

In the explanation, the name of the representative point is also used as the name of the region. In the example of FIG. 2, the region set based on the representative point a is region a, and the region set based on the representative point b is region b. The region set on the basis of the representative point is also called the region of the representative point.

For each representative point, the portion of the state space in which the representative point is the closest representative point may be the region of the representative point. In FIG. 2, the portion of the state space A1 where the nearest representative point is representative point a is set to region a. The portion of the state space A1 where the nearest representative point is representative point b is set to region b.

In this way, the region setting unit 191 sets regions in the state space by setting representative points in the state space. By having the region setting unit 191 set the regions, the training device 100 is expected to be able to perform training for each region, and respond more appropriately to changes in the state. For example, as described above, according to the training device 100, when the road surface becomes wet from rainfall from a state of being dry, and then becomes dry again, the same driving control as before the rainfall can be performed using the training result in the period before the rain fell.

The number of representative points is denoted by M, with the representative points being denoted by $r_1, r_2, \ldots, r_M$. M is an integer such that M≥1. The value of M may be variable. That is, the number of representative points set in the state space by the region setting unit 191 may dynamically change.

Also, the representative point closest to the sample $\xi$ is denoted as $s_1$. The representative point second closest to the sample $\xi$ is denoted as $s_2$. That is, the representative point $s_2$ is the representative point closest to the sample $\xi$ next to the representative point $s_1$. The clustering unit 193 or the region setting unit 191, for example, performs the process of specifying the representative points $s_1$ and $s_2$ from among the representative points $r_1, r_2, \ldots, r_M$.

Also, the region setting unit 191 updates the region on the basis of the sample $\xi$. Specifically, addition of an edge connecting two representative points, deletion of an edge, addition of a representative point, deletion of a representative point, and movement of a representative point are performed. Adding an edge is also referred to as providing a new edge. Adding a representative point is also referred to as newly providing a representative point.

The region setting unit 191 joins the regions of these representative points into one by connecting the representative points with edges. Also, the region setting unit 191 divides one region into a plurality of regions by deleting edges.

In this way, the region setting unit 191 can dynamically adjust the setting of regions according to the obtained samples $\xi$. The region setting unit 191 corresponds to an example of a region setting means.

For example, the region setting unit 191 may finely set regions in portions of the state space in which the number of obtained samples $\xi$ is large. Thereby, the training device 100 can use a relatively simple model such as a linear model as the partial function model, and can improve the accuracy of the model.

The accuracy of the model here is the accuracy of the output of the model. In the case of a partial function model, the degree of similarity (smallness of error) between the function value output by the partial function model and the correct value of that function value corresponds to the accuracy of the partial function model.

The correct value here is the value that is considered the target value of the value output by the partial function model when training data is input to the partial function model in the training of the partial function model. That is, the correct value here is the correct value in the training of the partial function model. A sample $\xi$ may be used as the training data input to the partial function model.

In addition, the region setting unit 191 may set a large region in a portion of the state space in which the number of obtained samples $\xi$ is small. As a result, the training device 100 can secure the number of samples $\xi$ in this region, and in this respect, can appropriately train the function (policy function or value function).

The region setting unit 191 may select the representative point to be processed on the basis of the distance in the state space.

For example, when the sample $\xi$ is obtained, the region setting unit 191 identifies the representative point $s_1$ and the representative point $s_t$ adjacent to the representative point $s_1$ via an edge. Two representative points being adjacent via an edge here means that there is an edge directly connected to both of the two representative points. Then, the region setting unit 191 moves the representative point $s_1$ and the representative point $s_t$ adjacent to the representative point $s_1$ via the edge so as to approach the sample $\xi$.

A set of representative points $s_t$ adjacent to the representative point $s_1$ via an edge is denoted by n. A set n is shown as in Equation (1).

[Math. 1]

$$n = \{s_t | s_t \text{ is connected with } s_1\} \tag{1}$$

Figure 3:
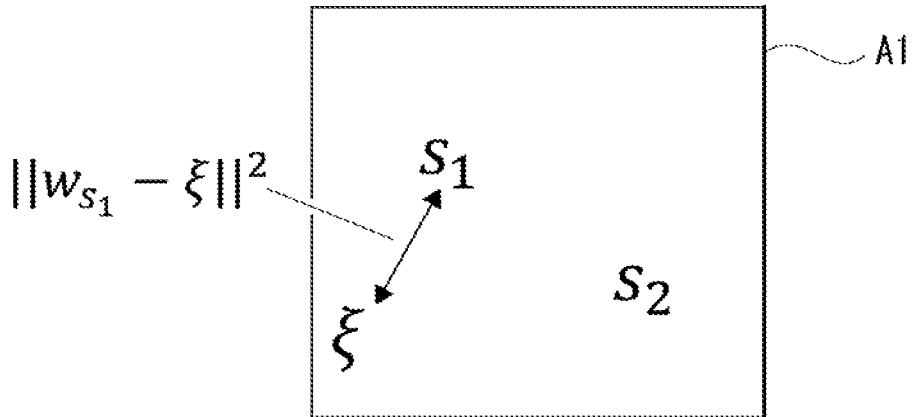
FIG. 3 is a diagram showing an example of an error calculated by the region setting unit according to the example embodiment.

FIG. 3 is a diagram showing an example of errors calculated by the region setting unit 191. In FIG. 3, a sample and representative points $s_1$ and $s_2$ are shown. As mentioned above, the representative point $s_1$ is the closest representative point to the sample $\xi$. The representative point $s_2$ is the second closest representative point to the sample $\xi$.

In the example of FIG. 3, the region setting unit 191 calculates, for each of the representative points $r_1, r_2, \ldots, r_M$, for example, the square error "$\|w_\xi - w_{ri}\|^2$" as an index value of the distance between the sample $\xi$ and the representative point. As described above, M is a positive integer indicating the number of representative points. i is an integer satisfying $1 \le i \le M$. "$\|w_\xi - w_{ri}\|^2$" indicates the square of the Euclidean distance between the representative point $r_i$ and the sample $\xi$.

The region setting unit 191 specifies the representative point $r_i$ with the smallest calculated square error as the representative point $s_1$ closest to the sample $\xi$.

Alternatively, the clustering unit 193 may specify the representative points $s_1$ and $s_2$, and the region setting unit 191 may use the information of the specified result by the clustering unit 193.

Figure 4:
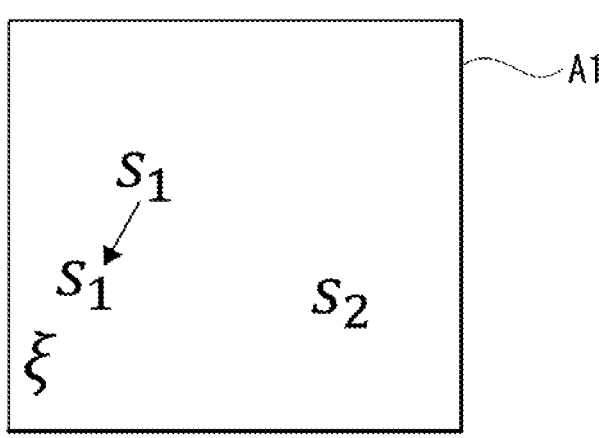
FIG. 4 is a diagram showing an example in which the region setting unit according to the example embodiment moves a representative point.

FIG. 4 is a diagram showing an example in which the region setting unit 191 moves the representative point $s_1$. In the example of FIG. 4, the region setting unit 191 brings the representative point $s_1$, which is the closest to the sample $\xi$, closer to the sample $\xi$.

For example, the region setting unit 191 updates the position vector $w_{s1}$ of the representative point $s_1$ on the basis of Equation (2).

[Math. 2]

$$w_{s_1} += \in_b (w_\xi - w_{s_1}) \tag{2}$$

$\varepsilon_b$ represents a real number constant of $0 \le \varepsilon_b \le 1$.

On the basis of Equation (2), the region setting unit 191 moves the representative point $s_1$ closer to the sample $\xi$ by the vector "$\varepsilon_u(w_\xi - w_{s1})$" of the $\varepsilon_b$ portion of the vector "$w_\xi - w_{s1}$" from the representative point $s_1$ to the sample $\xi$.

For example, the region setting unit 191 updates the position vector $w_{st}$ of the representative point $s_t$ on the basis of Equation (3).

[Math. 3]

$$w_{s_t} += \in_n (w_\xi - w_{s_t}) \tag{3}$$

In other words, based on Equation (3), the region setting unit 191 moves the representative point $s_t$ closer to the sample $\xi$ by the vector "$\varepsilon_n(w_\xi - w_{st})$" of the $\varepsilon_n$ portion of the vector "$w_\xi - w_{st}$" from the representative point $s_t$ to the sample $\xi$.

As described above, n is the set of representative points adjacent to representative point $s_1$ via edges, and $s_t \in n$.

$\varepsilon_n$ represents a real number constant of $0 \le \varepsilon_n \le 1$. The value of Fa may be the same as or different from the value of $\varepsilon_b$.

When the representative point $s_1$ closest to the sample $\xi$ and the representative point $s_2$ second closest to the sample $\xi$ are not adjacent to each other via an edge, the region setting unit 191 connects the representative point $s_1$ and the representative point $s_2$ with an edge. That is, each time a sample $\xi$ is obtained, the region setting unit 191 newly provides an edge connecting the representative point $s_1$ and the representative point $s_2$ specified based on the distance from the sample $\xi$.

Figure 5:
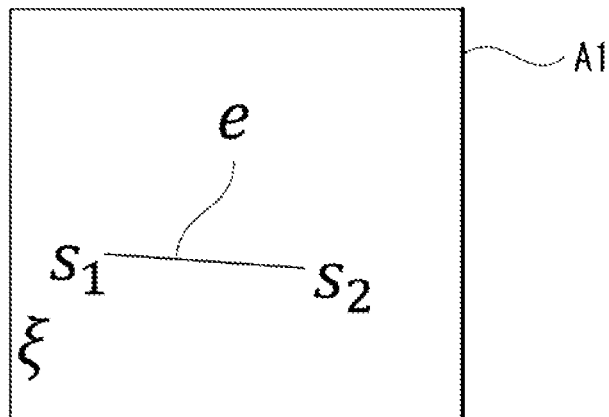
FIG. 5 is a diagram showing an example of an edge set by the region setting unit according to the example embodiment.

FIG. 5 is a diagram showing an example of an edge set by the region setting unit 191. In the example of FIG. 5, the region setting unit 191 provides the edge e connecting the representative point $s_1$ closest to the sample $\xi$ and the representative point $s_2$ second closest to the sample $\xi$.

As described above, the region setting unit 191 joins the regions of these representative points into one by connecting the representative points with edges. The training device 100 sets one partial function model as the partial function model that is linked to a set of representative points by being connected by edges. That is, the training device 100 sets a partial function model for each region.

Also, the region setting unit 191 provides an error counter variable for each representative point and calculates the error counter variable value. The error counter variable is a variable used to determine the position of the representative point when the region setting unit 191 newly sets the representative point. The error counter variable of the representative point $r_i$ is written as error($r_i$).

The region setting unit 191 initializes the value of the error counter variable to zero. Then, the region setting unit 191 updates the value of the error counter variable error($s_1$) of the representative point $s_1$ specified as the representative point closest to the sample based on, for example, Equation (4).

[Math. 4]

$$\text{error}(s_1) += \|w_\xi - w_{s_1}\|^2 \tag{4}$$

The square error "$\|w_\xi - w_{s_1}\|^2$" indicates the square of the Euclidean distance between the sample $\xi$ and the representative point $s_1$. The region setting unit 191 increases the value of the error counter variable error($s_1$) of the representative point $s_1$ by the square error "$\|w_\xi - w_{s1}\|^2$" on the basis of Equation (4). That is, the region setting unit 191 calculates a value obtained by adding the square error "$\|w_\xi - w_{s1}\|^2$" to the value of the error counter variable error($s_1$) of the representative point $s_1$. Then, the region setting unit 191 updates the value of the error counter variable error($s_1$) to the value of the addition result.

The region setting unit 191 identifies the representative point q with the largest error counter variable value and the representative point f with the largest error counter variable value among the representative points adjacent to that representative point q via edges at each timing of adding a predetermined representative point. Then, the region setting unit 191 sets a new representative point r between the representative points q and f. The timing for adding representative points may be set, for example, at regular time intervals.

The region setting unit 191 may calculate the position vector $w_r$ of the representative point r based on Equation (5).

[Math. 5]

$$w_r = 0.5(w_q + w_f) \tag{5}$$

$w_q$ indicates the position vector of the representative point q. $w_f$ indicates the position vector of the representative point f. According to Equation (5), the region setting unit 191 provides a new representative point r at the position of the middle point between the representative points q and f. However, the position where the region setting unit 191 provides the representative point r is not limited thereto. For example, the region setting unit 191 may provide a new representative point r at the position of the internal dividing point between the representative points q and f.

Figure 6:
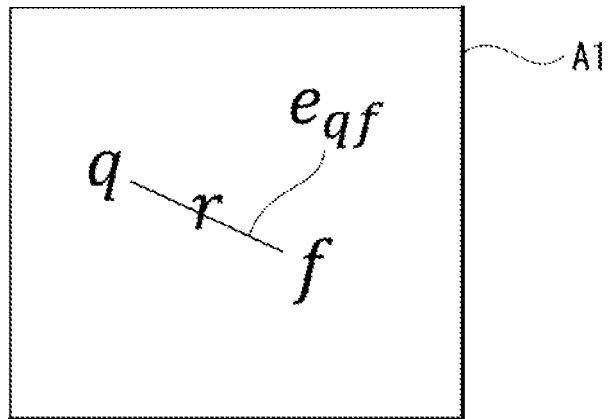
FIG. 6 is a diagram showing an example of a representative point newly provided by the region setting unit according to the example embodiment.

FIG. 6 is a diagram showing an example of representative points newly provided by the region setting unit 191. FIG. 6 shows representative points q, f and r and an edge $e_{qf}$ connecting the representative points q and f. The representative point q is the representative point with the maximum value of the error counter variable. The representative point f is the representative point having the maximum value of the error counter variable among the representative points adjacent to the representative point q by an edge. In the example shown in FIG. 6, the region setting unit 191 provides a new representative point r at the midpoint between the representative points q and f.

Moreover, the region setting unit 191 performs replacement of edges.

For example, the region setting unit 191 replaces the edge connecting the representative point q and the representative point f with an edge through the new representative point r. Specifically, the region setting unit 191 newly provides an edge connecting the representative points q and r and an edge connecting the representative points r and f. Further, the region setting unit 191 erases the edge (original edge) directly connecting the representative point q and the representative point f.

Figure 7:
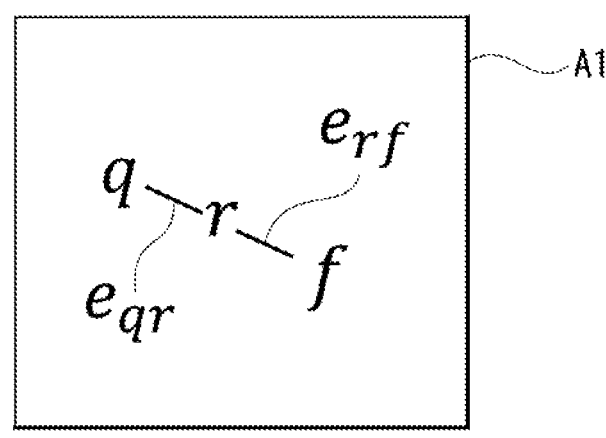
FIG. 7 is a diagram showing an example of an edge after replacement by the region setting unit according to the example embodiment.

FIG. 7 a diagram showing an example of an edge after replacement by the region setting unit 191 according to the example embodiment. FIG. 7 shows an example of the case in which the region setting unit 191 has replaced the edge from the state shown in FIG. 6. In the example of FIG. 7, the edge $e_{qf}$ connecting the representative points q and f is deleted, and the edge $e_{qr}$ connecting the representative points q and r and the edge $e_{rf}$ connecting the representative points r and f are provided.

Regarding edge deletion, the region setting unit 191 calculates the "age" for each edge.

The age of the edge here is an index value based on the positional relationship between the sample $\xi$ and representative points at both ends of the edge. The region setting unit 191 sets the age of the newly provided edge to zero. Also, each time the region setting unit 191 acquires a sample $\xi$ and identifies a representative point $s_1$ closest to the sample $\xi$, it increases the ages of all edges directly connected to the representative point $s_1$ by, for example, 1. On the other hand, the region setting unit 191 sets the age of the edge connecting the representative points $s_1$ and $s_2$ to zero. For the sake of convenience, the expression "age" is used, but "age" should indicate the number of times the representative point $s_1$ is specified (updated).

The region setting unit 191 eliminates edges whose age is greater than a predetermined constant.

The region setting unit 191 also removes isolated representative points by edge removal. An isolated representative point referred to here is a representative point to which no edges are connected.

As described above, the region setting unit 191 increases by 1 the ages of all edges directly connected to the representative point $s_1$ closest to the sample $\xi$ each time the sample acquisition unit 192 acquires the sample $\xi$. The region setting unit 191 eliminates edges whose age is greater than a predetermined constant.

As a result, it is conceivable that edges are likely to be erased in regions where the number of samples $\xi$ to be classified is large. It is expected that the elimination of edges will allow a single region to be divided into a plurality of regions, enabling detailed setting of the function.

However, if the region setting unit 191 uniformly deletes edges in the vicinity of the sample $\xi$, it is conceivable that the edge deletion will isolate representative points and cause the isolated representative points to be deleted as well. By deleting isolated representative points, it is conceivable that a region will remain as is without being divided even if the edges are deleted.

Therefore, as described above, the region setting unit 191 sets the age of an edge directly connecting the representative point $s_1$ closest to the sample $\xi$ and the representative point $s_2$ second closest to the sample $\xi$ to 0. If there is no edge directly connecting the representative points $s_1$ and $s_2$, the region setting unit 191 newly provides this edge and sets the age to zero.

As a result, it is possible to prevent the representative point $s_1$ closest to the sample $\xi$ from being deleted when the edge is deleted, and so it is expected that the region will be divided.

Thus, the process of eliminating edges according to age allows for appropriate region setting even when the state space is changing.

Edge age corresponds to an example of an index value based on the distance between a sample $\xi$ and a representative point in the state space. The fact that the edge age is greater than a predetermined constant is an example of the index value satisfying a predetermined condition.

The sample acquisition unit 192 acquires the sample $\xi$.

The method by which the sample acquisition unit 192 acquires the sample $\xi$ is not limited to a specific method. For example, the control object 900, which corresponds to an example of an agent, may include a sensor to generate state information at predetermined sampling intervals, and transmit the generated state information to the training device. Then, the sample acquisition unit 192 may read the state information from the reception data received by the communication unit 110 from the control object 900 and acquire it as the sample $\xi$.

Alternatively, the sample acquisition unit 192 may acquire a batch containing a plurality of samples as training data, and acquire the sample $\xi$ by reading the sample $\xi$ from the batch. Alternatively, the sample acquisition unit 192 may acquire a mini-batch obtained by extracting some samples from the batch as training data, and read the sample $\xi$ from the mini-batch to acquire the sample $\xi$.

The method by which the sample acquisition unit 192 acquires batches or mini-batches is not limited to a specific method. For example, the sample acquisition unit 192 may access another device via the communication unit 110 and acquire a batch or mini-batch from the other device.

Alternatively, the sample acquisition unit 192 may accumulate samples acquired from, for example, the control object 900 as a batch. Furthermore, the sample acquisition unit 192 may extract mini-batches from batches.

The clustering unit 193 determines in which region the sample $\xi$ is included. For example, the clustering unit 193 calculates the distance in the state space between the sample $\xi$ acquired by the sample acquisition unit 192 and each of the representative points $r_1, r_2, \ldots, r_M$. Then, the clustering unit 193 identifies the representative point $s_1$ closest to the sample $\xi$ and the representative point $s_2$ second closest to the sample $\xi$.

The clustering unit 193 corresponds to an example of a clustering means.

The representative points $s_1$ and $s_2$ specified by the clustering unit 193 are used by the region setting unit 191 to update the region described above. Alternatively, the region setting unit 191 may specify the representative points $s_1$ and $s_2$ separately from the clustering unit 193.

Also, the clustering unit 193 determines that the sample $\xi$ is included in the region set by the representative point $s_1$.

The distance index used by the clustering unit 193 is not limited to the Euclidean distance or its square error, but may be various indices that indicate the magnitude of the positional difference in the state space. For example, the clustering unit 193 may calculate the Mahalanobis distance as the distance between the sample $\xi$ and each of the representative points.

By changing the distance calculation index used by the clustering unit 193 in this way, the space may be distorted in comparison with the case where the Euclidean distance is used.

For example, in FIG. 3, the clustering unit 193 calculates the distance between the sample $\xi$ and each of the representative points using the Euclidean distance, and specifies the representative points $s_1$ and $s_2$. As described above, the representative point $s_1$ is the closest representative point to the sample $\xi$, and the representative point $s_2$ is the second closest representative point to the sample $\xi$.

In contrast, when the clustering unit 193 calculates the distance between the sample $\xi$ and each representative point using the Mahalanobis distance, the distance between the sample $\xi$ and the representative point $s_2$ may be shorter than the distance between the sample $\xi$ and the representative point $s_1$. In this case, the clustering unit 193 specifies the representative point represented by $s_2$ in FIG. 3 as the representative point $s_1$ closest to the sample $\xi$. The clustering unit 193 also specifies the representative point represented by $s_1$ in FIG. 3 as the representative point $s_2$ that is second closest to the sample $\xi$.

In this way, when the clustering unit 193 uses the Mahalanobis distance, the order of closeness of the representative points to the sample $\xi$ may differ from that in the case of using the Euclidean distance. This can be ascertained as the space being distorted by the clustering unit 193 using the Mahalanobis distance. In the case of the example of FIG. 3 described above, the clustering unit 193 shortens the distance along the horizontal axis direction using the Mahalanobis distance, so that the representative point $s_2$ can be understood as being closer to the sample $\xi$ than the representative point $s_1$.

Now consider the case where the state space is constructed with horizontal and vertical coordinate axes, with the horizontal direction being more important than the vertical direction. As a result, the semantic coordinate space of the data is assumed to be a space resulting from a contraction of the Euclidean space in the horizontal direction.

When the clustering unit 193 uses the Euclidean distance as a distance calculation index, the distance is calculated using the difference between the coordinates of the two points as is for both the vertical and horizontal axis directions, with no compression of the state space being performed. Accordingly, the clustering unit 193 cannot calculate distances reflecting importance in the horizontal axis direction.

On the other hand, when the clustering unit 193 uses the Mahalanobis distance as a distance calculation index, different scales can be used in the vertical and horizontal directions, and the state space can be compressed in the horizontal axis direction. Thereby, the clustering unit 193 can calculate distances reflecting importance in the horizontal axis direction.

By using the Mahalanobis distance by the clustering unit 193, the state space can be scaled in various directions, not limited to the horizontal and vertical axis directions described above. As a result, the clustering unit 193 can calculate a distance that reflects the difference in priority for each coordinate axis or the difference in the definition of distance for each coordinate axis.

Moreover, the clustering unit 193 can perform learning of the matrix itself that defines the Mahalanobis distance. In other words, the clustering unit 193 can learn how to distort the state space. With such processing, the state space can be divided into regions with higher accuracy even when the importance of the coordinate axes is unknown or even when the importance thereof changes.

For example, the clustering unit 193 may perform learning of a matrix that defines the Mahalanobis distance using external information.

The learning of how to distort the state space by the clustering unit 193 and the learning of setting of regions by the region setting unit 191 may be performed at the same time. Here, performing a plurality of pieces of learning at once means performing the plurality of pieces of learning by a series of machine training using the same training data.

The method by which the clustering unit 193 distorts the state space is not limited to the method using the Mahalanobis distance. For example, the clustering unit 193 may calculate the distance by weighting the distance component for each coordinate axis by multiplying the distance component for each coordinate axis by a coefficient according to the importance of that coordinate axis method.

The clustering unit 193 may calculate an index value for the distance between the sample $\xi$ and each of the representative points $r_1, r_2, \ldots, r_M$ on the basis of the function value calculated by applying the sample $\xi$ to the partial function model, and the value obtained on the basis of the sample $\xi$.

For example, consider a case where the sample acquisition unit 192 acquires a new sample $\xi$, and the clustering unit 193 calculates the index value of the distance between this sample $\xi$ and the representative point $r_i$.

In this case, the clustering unit 193 may calculate an index value for the distance based not only on the distance between the sample $\xi$ and the representative point $r_i$, but also on the magnitude of the difference between the function value obtained by inputting the sample $\xi$ into the partial function model associated with the representative point $r_i$ and the correct value of this function value. This correct value corresponds to an example of a value obtained on the basis of the sample $\xi$.

The clustering unit 193 may use the index value "index($\xi$, $r_i$)" shown in Equation (6) as the index value of the distance between the sample $\xi$ and the representative point $r_i$.

[Math. 6]

$$\text{index}(\xi,r_i)=\sqrt{\|w_\xi-w_{r_i}\|^2+|f_{r_i}(\xi)-f_c|^2} \tag{6}$$

As in the case of Equation (4), "$\|w_\xi-w_{r_i}\|$" indicates the Euclidean distance between the sample $\xi$ and the representative point $r_i$. $f_{r_i}$ indicates a partial function model associated with the representative point $r_i$, and $f_{r_i}(\xi)$ indicates a function value obtained by inputting a sample $\xi$ into the partial function model $f_{r_i}$. $f_c$ denotes the correct value for sample $\xi$. "$|f_{r_i}(\xi)-f_c|$" indicates the absolute value (magnitude of difference) of the difference between the function value $f_{r_i}(\xi)$ and the correct value $f_c$.

The clustering unit 193 calculates a distance index value for each of the representative points, and identifies the representative point $s_1$ closest to the sample $\xi$ and the representative point $s_2$ second closest to the sample $\xi$ based on the calculated values.

A known method can be used as the method of calculating the correct value of the function value output by the partial function model. For example, when a combination of partial function models is used as the value function, a value obtained by performing temporal integration of the expected value of the reward may be used as the correct value.

A case where the training unit 195 calculates the correct value will be described below as an example. However, the functional unit that calculates the correct value is not limited to a specific functional unit. Alternatively, the training device 100 may acquire the correct value from another device.

When the clustering unit 193 uses the distance index value described above, the training unit 195 calculates the correct value of the function value obtained by inputting the sample $\xi$ into the function (policy function or value function) represented by the combination of the partial function models. This correct value corresponds to the correct value $f_c$ of Equation (6).

Also, for all the representative points, the clustering unit 193 inputs the sample $\xi$ into the partial function model associated with the representative point to calculate the function value. This function value corresponds to the function value $f_{r_i}(\xi)$ of Equation (6).

Here, although the domain of the partial function model can be considered to be limited to the region, the clustering unit 193 calculates the function value assuming that the domain of the partial function model is extended to the entire state space. That is, the clustering unit 193 inputs the sample $\xi$ into the partial function model and calculates the function value assuming that the sample $\xi$ is included in the domain of the partial function model regardless of the region.

By the clustering unit 193 using the index value of the distance described above, a representative point whose function value obtained by inputting the sample $\xi$ into the partial function model is closer to the correct value is more easily selected as the region containing the sample $\xi$ than when the distance itself is used. In this respect, the training device 100 is expected to be able to calculate function values using partial function models with relatively high accuracy.

Even when the clustering unit 193 uses the index value of the distance, the Mahalanobis distance may be used to calculate the distance in calculating the index value.

The Mahalanobis distance or the aforementioned index value of the distance may also be used for calculation when the region setting unit 191 updates the region. For example, the region setting unit 191 may use the Mahalanobis distance or the aforementioned index value of the distance instead of the Euclidean distance "$\|w_\xi-w_{s_1}\|$" in the above Equation (4).

The model-setting unit 194 sets a partial function model for each region. Also, the model-setting unit 194 updates the partial function model associated with the region determined to include the sample $\xi$ based on the sample $\xi$. Therefore, it can be said that, among the plurality of partial function models provided for each region, the model-setting unit 194 updates the partial function model for the region including the sample $\xi$ based on the sample $\xi$.

The model-setting unit 194 corresponds to an example of a model-setting means.

Updating of the partial function model by the model-setting unit 194 corresponds to training of the partial function model. The model-setting unit 194 can use a known algorithm relating to training of a policy function or a known algorithm relating to training of a value function as an algorithm that performs training of the partial function model. For example, the model-setting unit 194 may update the parameter values of the partial function model using a gradient method such as error backpropagation, but is not limited thereto.

Various types of trainable models can be used as partial function models. The model-setting unit 194 may use the same type of model for all regions, or may use different types of models for each region.

For example, the partial function model associated with at least one region may be a linear model. Also, the partial function model associated with at least one region may be a nonlinear model.

A partial function model associated with at least one region may be configured using a neural network. In this case, various neural networks can be used. For example, by using a neural network with few layers as a partial function model, the time required for training can be shortened. Thus, the choice of neural network can determine the type of training to be done.

When the region setting unit 191 deletes an edge, the region that had been combined into one by the edge may be divided into a plurality of regions. When one region is divided into a plurality of regions, the model-setting unit 194 assigns a partial function model to each region after division and initializes the assigned partial function models.

The method of initializing the partial function model in this case is not limited to a specific method.

For example, the region setting unit 191 may initialize the partial function model for each region after the division so as to indicate the same function as the partial function model associated with the region before the division.

Alternatively, the region setting unit 191 may randomly initialize the parameter values of the partial function model for each region after the division.

Alternatively, the region setting unit 191 may perform the initialization of the partial function model associated with the divided region so as to become an average model of the partial function models associated with regions near the region. A region near a region may be a region adjacent to the region.

For example, the region setting unit 191 may calculate the average value of the parameter values of the partial function models associated with regions near the region after the division and initially set it as the parameter value of the partial function model associated with the region after the division. The region setting unit 191 may calculate the median value, mode value, or the like of the parameter values of the partial function models instead of the average value.

Also, when the region setting unit 191 newly provides an edge connecting two representative points, the regions of these two representative points are combined into one region. In this case, the model-setting unit 194 assigns one partial function model to the combined area and initializes the assigned partial function model.

The method of initializing the partial function model in this case is not limited to a specific method.

For example, the region setting unit 191 may initialize the partial function model associated with the region after connection so as to become an average model of the partial function models linked to the region before connection. Furthermore, for example, the region setting unit 191 may calculate the average value of the parameter values of the partial function models associated with the regions before connection and initially set it as the parameter value of the partial function model linked to the region after connection. In this case as well the region setting unit 191 may calculate the median value, mode value, or the like of the parameter values of the partial function models instead of the average value.

Alternatively, the region setting unit 191 may associate any one of the partial function models associated with the region before combination with the region after combination.

The training unit 195 uses at least one of the policy function and the value function on the basis of the partial function model associated with the region determined to include the sample ξ, and performs learning of the control of the control object.

For example, consider the case where the state of the control object 900 is (assumed to be) a certain state represented using "sample ξ". In this case, the training unit 195 evaluates the action of the control object 900 in response to control (operation, processing, etc.) over the control object 900 on the basis of the model for the region containing the sample indicating the state of the control object 900 (a model associated with the region).

The training unit 195 corresponds to an example of a training means.

A known reinforcement learning algorithm can be used as the training algorithm used by the training unit 195. That is, the function (policy function or value function) in the state space is configured by combining partial function models for each region, whereby the training algorithm performed by the training unit 195 can be the same as a known reinforcement learning algorithm.

When the training unit 195 uses a training algorithm including training of partial function models, the model-setting unit 194 may be configured as part of the training unit 195.

As an example of the case where the training unit 195 uses a training algorithm including training of partial function models, the training unit 195 performs Q-learning, and the Q function corresponding to the example of the value function is composed of a combination of partial function models; however, the training unit 195 is not limited thereto.

If the correct value is not calculated until the training unit 195 performs learning of the control of the control object, the clustering unit 193 may calculate the distance between the sample ξ and the representative point, and after obtaining the correct value, recalculate the index value of the above distance.

For example, when the sample acquisition unit 192 acquires the sample ξ, the clustering unit 193 calculates the distances between the sample ξ and each of the representative points, and classifies (clusters) the sample ξ into any region. The training unit 195 performs learning of the control of the control object using the function value by the partial function model associated with the region containing the sample ξ.

When the training unit 195 calculates the correct value by training, the clustering unit 193 calculates the index value of the distance between the sample ξ and each of the representative points, and identifies the representative point $s_1$ closest to the sample ξ and the representative point $s_2$ that is second closest to the sample ξ. The region setting unit 191 updates the region based on the distance index value calculated by the clustering unit 193 and the representative points $s_1$ and $s_2$ identified by the clustering unit 193.

The clustering unit 193 may narrow down the representative points for which the distance index value is to be calculated based on the distance between the sample ξ and each of the representative points. For example, the clustering unit 193 may calculate the index value of the distance between the sample ξ and the representative point only for the top five representative points in order of decreasing distance to the sample ξ.

The object control unit 196 controls the control object 900 based on the training result of the training unit 195.

For example, the object control unit 196 uses the policy function obtained by the training by the training unit 195 to determine the action to be performed by the control object 900. The object control unit 196 then generates a control signal indicating the determined action and transmits the control signal to the control object 900 via the communication unit 110. Thereby, the object control unit 196 controls the control object 900 so as to cause the control object 900 to perform the determined action.

Figure 8:
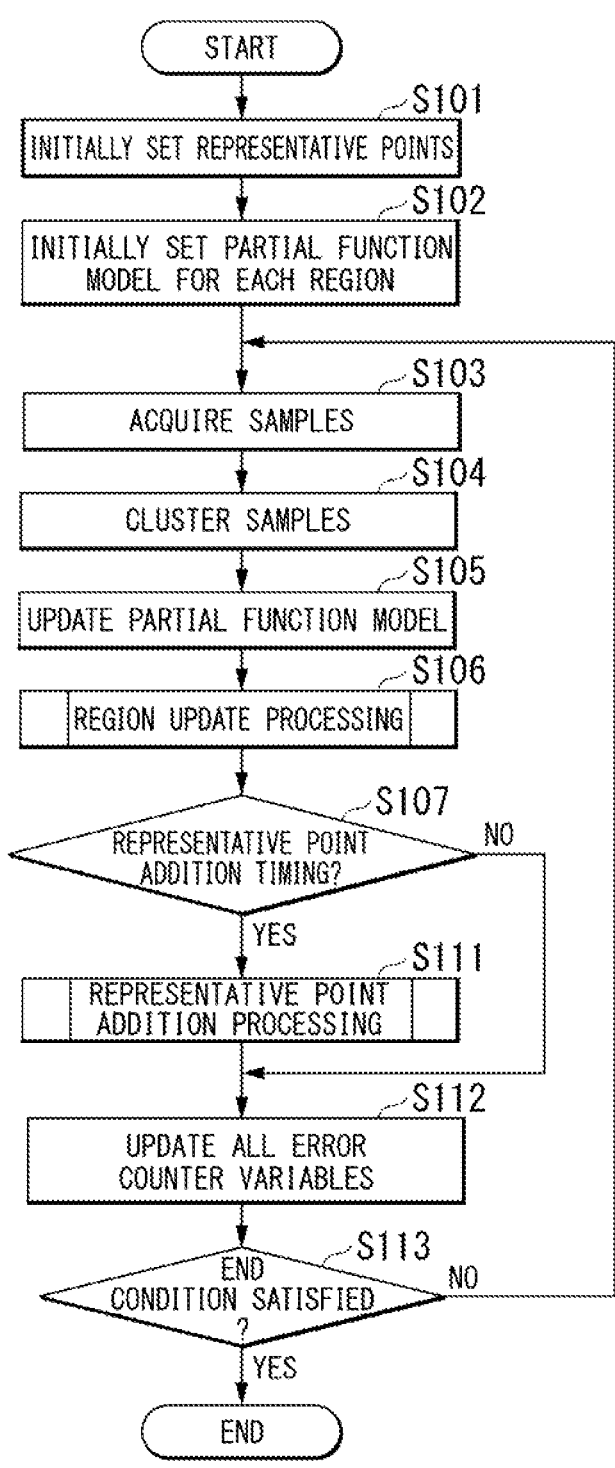
FIG. 8 is a flowchart showing an example of a processing procedure performed by the training device according to the example embodiment.

FIG. 8 is a flowchart showing an example of the processing procedure performed by the training device 100.
(Step S101)

The region setting unit 191 initially sets representative points. Specifically, the region setting unit 191 arranges two representative points a and b at random positions in the state space.

As described above, the position vector of representative point a is denoted by $w_a$, and the position vector of representative point b is denoted by $w_b$. Let the dimension of the state space be n-dimensional and let $w_a$, $w_b \in R^n$. $R^n$ indicates an n-dimensional real number space.

When newly providing a representative point, the region setting unit 191 sets an error counter variable for the representative point and sets the initial value of the error counter variable to zero.

After Step S101, the process proceeds to Step S102.
(Step S102)

The model-setting unit 194 initially sets a partial function model for each region determined based on the initialized representative points.

As described above, the model-setting unit 194 may set the same type of model for all regions. Alternatively, the model-setting unit 194 may set different types of models for each region.

Also, the model-setting unit 194 may similarly initialize the partial function models of all regions, such as initializing the outputs of the partial function models of all regions to 0. Alternatively, the model-setting unit 194 may individually initialize the partial function models for each region, such as when a certain amount of information has been obtained regarding rewards or policies.

After Step S102, the process proceeds to Step S103.
(Step S103)

The sample acquisition unit 192 acquires the samples $\xi$. As mentioned above, the samples $\xi$ are individual states that the agent acquires in response to actions.

As described above, the sample acquisition unit 192 may acquire samples from the control object 900 one by one, for example. Alternatively, the sample $\xi$ acquisition unit 192 may acquire a batch or mini-batch of samples and read the samples $\xi$ from the batch or mini-batch.

After Step S103, the process proceeds to Step S104.
(Step S104)

The clustering unit 193 clusters the samples $\xi$.

As described above, the clustering unit 193 calculates the distance between the sample $\xi$ and each of the representative points or the index value of the distance, and determines the region of the representative point closest to the sample $\xi$ as the region containing the sample $\xi$. The clustering unit 193 may use the Euclidean distance as the distance.

The clustering unit 193 may specify and record the representative point $s_1$ closest to the sample $\xi$ and the representative point $s_2$ second closest to the sample $\xi$ based on the calculated distance or distance index value.

After Step S104, the process proceeds to Step S105.
(Step S105)

The model-setting unit 194 updates the partial function model associated with the region in which the sample $\xi$ is classified.

As described above, updating of the partial function model by the model-setting unit 194 corresponds to training of the partial function model. The model-setting unit 194 may use a known algorithm for training of the partial function model.

After Step S105, the process proceeds to Step S106.
(Step S106)

The region setting unit 191 updates the region.

In Step S106, the region setting unit 191 moves representative points, adds an edge when there is no edge directly connecting the representative point $s_1$ and the representative point $s_2$, deletes an edge, and deletes a representative point along with the deletion of an edge. The region setting unit 191 adds representative points and updates the edge associated with the addition of the representative points in Step S111.

After Step S106, the process proceeds to Step S107.
(Step S107)

The region setting unit 191 determines whether or not the time to add a representative point has arrived.

The timing of adding the representative point is not limited to a specific timing. For example, one representative point may be added (that is, a new representative point may be provided) each time the number of input signals becomes an integer multiple of the integer constant $\lambda$, but it is not limited thereto.

When the region setting unit 191 determines that the timing for adding a representative point has arrived (Step S107: YES), the process transitions to Step S111.

When the region setting unit 191 determines that the timing for adding a representative point has not arrived (Step S107: NO), the process transitions to Step S112.
(Step S111)

The region setting unit 191 adds a representative point. As described above, the region setting unit 191 updates edges as representative points are added.

After Step S111, the process proceeds to Step S112.
(Step S112)

The region setting unit 191 updates all error counter variables.

Specifically, the region setting unit 191 discounts the values of the error counter variables of all representative points by the coefficient d. The coefficient d is a real number constant that satisfies $0 \leq d \leq 1$. The region setting unit 191 multiplies the value of the error counter variable $error(r_i)$ of the representative point $r_i$ (i is an integer satisfying $1 \leq i \leq N$) by the coefficient d, as shown in Equation (7).

[Math. 7]

$$error(r_i)^* = d \tag{7}$$

After Step S112, the process proceeds to Step S113.
(Step S113)

The region setting unit 191 determines whether or not a predetermined end condition is satisfied.

When the region setting unit 191 determines that the end condition is not satisfied (Step S113: NO), the process transitions to Step S103.

When the region setting unit 191 determines that the end condition is satisfied (Step S113: YES), the training device 100 ends the processing of FIG. 8.

Figure 9:
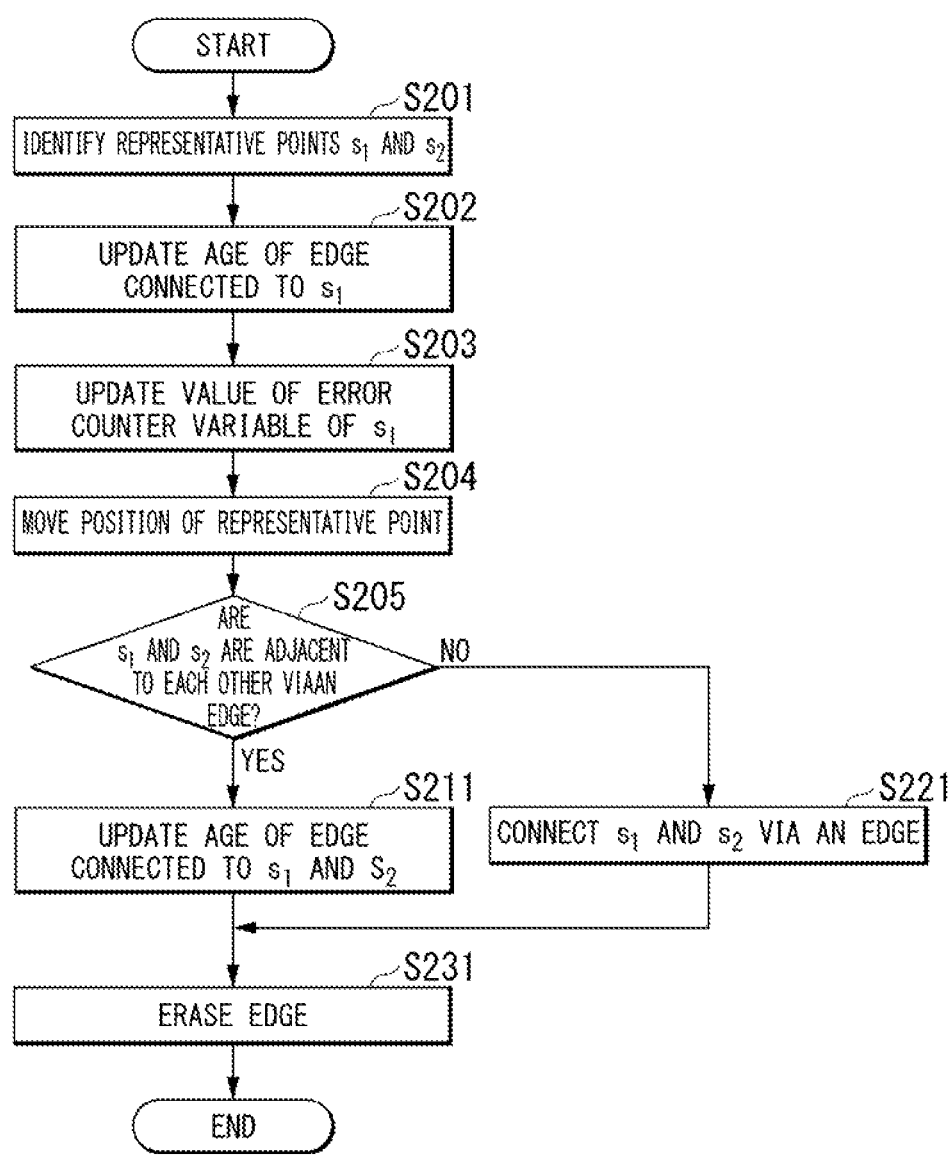
FIG. 9 is a flowchart showing an example of a processing procedure in which the training device according to the example embodiment updates a region.

FIG. 9 is a flowchart showing an example of a processing procedure in which the training device 100 updates a region. The training device 100 performs the process shown in FIG. 9 in Step S106 of FIG. 8.
(Step S201)

The region setting unit 191 identifies the representative point $s_1$ closest to the sample $\xi$ and the representative point $s_2$ second closest to the sample $\xi$.

The region setting unit 191 may acquire information indicating the representative points $s_1$ and $s_2$ specified by the clustering unit 193 in Step S104 of FIG. 8. Alternatively, the region setting unit 191, separately from the clustering unit 193, may calculate the distance between the sample $\xi$ and each of the representative points or the index value of the distance to specify the representative points $s_1$ and $s_2$.

After Step S201, the process proceeds to Step S202.
(Step S202)

The region setting unit 191 adds, for example, 1 to the ages of all edges directly connected to the representative point $s_1$. As described above, the age of an edge is a value used to determine whether to erase that edge.

Edges may not be present, such as the initial state of the region illustrated in FIG. 2. If no edge exists, the region setting unit 191 does not perform edge-related processing.

Even in Step S202, if there is no edge, the region setting unit 191 does not perform processing.

After Step S202, the process proceeds to Step S203.
(Step S203)

The region setting unit 191 updates the value of the error counter variable of the representative point $s_1$. As described above, the error counter variable is a variable used to determine the position of the representative point when the region setting unit 191 newly sets the representative point.

The region setting unit 191 adds an error to the value of the error counter variable of the representative point $s_1$ based on, for example, Equation (4) above.

After Step S203, the process proceeds to Step S204.
(Step S204)

The region setting unit 191 moves the position of the representative point.

As described above, the region setting unit 191 moves the representative point $s_1$ and the representative point $s_t$ adjacent to the representative point $s_1$ via the edge so as to approach the sample $\xi$. For example, the region setting unit 191 updates the position of the representative point $s_1$ based on the above Equation (2). The region setting unit 191 also updates the position of the representative point $s_1$ based on the above Equation (3).

After Step S204, the process proceeds to Step S205.
(Step S205)

The region setting unit 191 determines whether or not the representative point $s_1$ and the representative point $s_2$ are adjacent via an edge.

When the region setting unit 191 determines that the representative points s1 and s2 are adjacent to each other via an edge (Step S205: YES), the process transitions to Step S211.

When the region setting unit 191 determines that the representative points s1 and s2 are not adjacent to each other via an edge (Step S205: NO), the process transitions to Step S221.
(Step S211)

The region setting unit 191 increases the age of the edge connected to both the representative points $s_1$ and $s_2$. That is, the region setting unit 191 calculates a value obtained by adding 1 to the age of the edge connected to both the representative points $s_1$ and $s_2$. Then, the region setting unit 191 updates the age of the edge connected to both the representative point $s_1$ and the representative point $s_2$ to the value of the addition result.

After Step S211, the process transitions to Step S231.
(Step S221)

The region setting unit 191 connects the representative point $s_1$ and the representative point $s_2$ with an edge. That is, the region setting unit 191 newly provides an edge connecting the representative points $s_1$ and $s_2$. The region setting unit 191 sets the age of the newly provided edge to zero.

After Step S221, the process transitions to Step S231.
(Step S231)

The region setting unit 191 erases all edges whose age is greater than a predetermined constant $a_{max}$. The region setting unit 191 also removes representative points isolated by the edge removal.

As described above, when the number of regions increases or decreases due to addition or deletion of edges, the model-setting unit 194 assigns partial function models to regions so that one partial function model is associated with one region. Then, the model-setting unit 194 initializes the newly assigned partial function model.

After Step S231, the training device 100 ends the processing of FIG. 9. Upon completion of the processing in FIG. 9, the processing transitions to Step S107 in FIG. 8.

Figure 10:
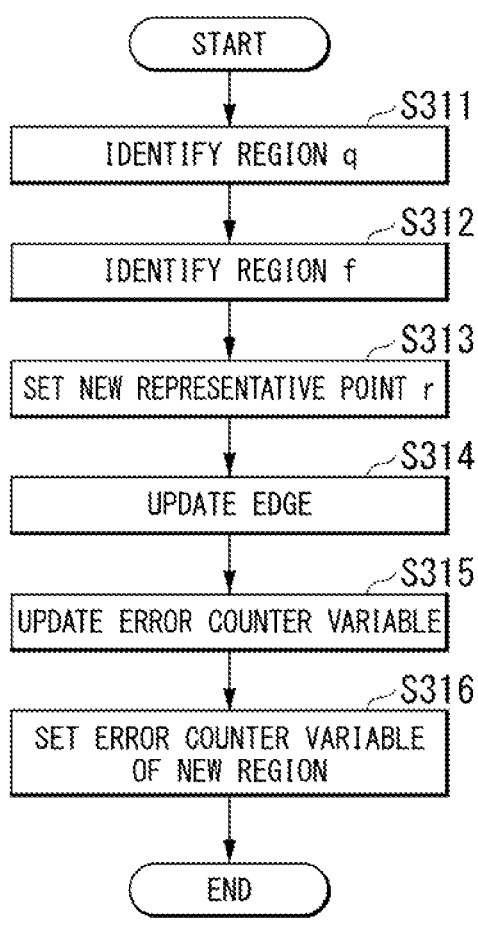
FIG. 10 is a flowchart showing an example of a processing procedure in which the training device adds representative points according to the example embodiment.

FIG. 10 is a flowchart showing an example of the processing procedure in which the training device 100 adds a representative point. The training device 100 performs the process of FIG. 10 in Step S111 of FIG. 8.
(Step S311)

The region setting unit 191 identifies the representative point q with the maximum value of the error counter variable.

After Step S311, the process proceeds to Step S312.
(Step S312)

The region setting unit 191 identifies the representative point f having the maximum value of the error counter variable among the representative points adjacent to the representative point q via an edge.

After Step S312, the process proceeds to Step S313.
(Step S313)

The region setting unit 191 provides a new representative point r between the representative points q and f. For example, the region setting unit 191 may set the representative point r at the middle point between the representative points q and f based on the above Equation (5).

After Step S313, the process proceeds to Step S314.
(Step S314)

The region setting unit 191 replaces the edge connecting the representative point q and the representative point f with an edge through the new representative point r.

For example, the region setting unit 191 newly provides an edge connecting the representative points q and r, and sets the age of this edge to zero. The region setting unit 191 also newly provides an edge connecting the representative points r and f, and sets the age of this edge to zero. Further, the region setting unit 191 erases the edge (original edge) directly connecting the representative point q and the representative point f.

After Step S314, the process proceeds to Step S315.
(Step S315)

The region setting unit 191 updates the error counter variables of the representative points q and f that are the basis for determining the position of the new representative point r.

Specifically, the region setting unit 191 discounts the value of the error counter variable error(q) of the representative point q by the coefficient $\alpha$. The coefficient $\alpha$ is a real number constant that satisfies $0 \leq \alpha \leq 1$.

Specifically, the region setting unit 191 multiplies the value of the error counter variable error(q) of the representative point q by the coefficient $\alpha$, as shown in Equation (8). That is, the region setting unit 191 calculates a value obtained by multiplying the value of the error counter variable error(q) of the representative point q by the coefficient $\alpha$. Then, the region setting unit 191 updates the value of the error counter variable error(q) to the value of the multiplication result.

[Math. 8]

$$\mathrm{error}(q)^{*} = \alpha \tag{8}$$

The region setting unit 191 also discounts the value of the error counter variable error(f) of the representative point f by the coefficient $\alpha$. Specifically, the region setting unit 191 multiplies the value of the error counter variable error(f) of the representative point f by the coefficient $\alpha$, as shown in Equation (9). That is, the region setting unit 191 calculates a value obtained by multiplying the value of the error counter variable error(f) of the representative point f by the coefficient α. Then, the region setting unit 191 updates the value of the error counter variable error(f) to the value of the multiplication result.

[Math. 9]

$$error(f)^* = \alpha \tag{9}$$

After Step S315, the process proceeds to Step S316.
(Step S316)

The region setting unit 191 sets the initial value of the error counter variable error(r) of the representative point r to the value of the error counter variable error(q) of the representative point q after the discounting in Step S315. That is, the region setting unit 191 substitutes the value of the error counter variable error(q) for the error counter variable error(r) as shown in Equation (10).

[Math. 10]

$$error(r) \leftarrow error(q) \tag{10}$$

"←" indicates substitution.

After Step S316, the training device 100 ends the processing of FIG. 10. Upon completion of the processing in FIG. 10, the processing transitions to Step S112 in FIG. 8.

As described above, the model-setting unit 194 updates a model for a region that includes a given sample on the basis of the sample, among a plurality of models provided for each region into which is divided a state space that includes a sample that indicates a state about the control object 900 and representing an evaluation of the action of the control object 900 in response to control over the control object 900. The training unit 195 evaluates the action of the control object 900 in a given state, on the basis of the model for the region that includes a sample indicating the state.

According to the training device 100, training can be performed for each region obtained by dividing the state space, and in this respect, it is possible to more appropriately cope with environmental changes in reinforcement learning.

Also, the clustering unit 193 determines which region in the state space the sample ξ is included in.

The determination result of the clustering unit 193 can be used for both updating the model and controlling the control object 900. The region indicated by the determination result of the clustering unit 193 is the region containing the sample ξ.

The model-setting unit 194 can use the sample ξ to update the model associated with the region containing the sample ξ. The training unit 195 can perform learning of the control of the control object 900 using the state indicated by the sample ξ and the value obtained by inputting to the model associated with the region containing the sample ξ. A value obtained by inputting into a model associated with the region containing the sample ξ indicates a policy or a reward.

Also, the region setting unit 191 updates the region on the basis of the sample ξ acquired by the sample acquisition unit 192.

The region setting unit 191 dynamically updates the region on the basis of the sample ξ, so that the training device 100 is expected to be able to respond more appropriately to environmental changes in reinforcement learning.

Also, the region setting unit 191 updates the region on the basis of the Mahalanobis distance between the point where the sample ξ is positioned in the state space and the representative point of each region.

As a result, the training device 100 can perform weighting for each coordinate in the state space, and so is expected to perform training more appropriately.

Also, the region setting unit 191 updates the region based on the difference between the value calculated by applying the sample ξ to the partial function model and the value obtained based on the sample ξ.

According to the training device 100, it is possible to set the region in consideration of not only the value of the state but also the value of the function to be trained, and in this respect, it is expected that the region can be set more appropriately.

Also, the region setting unit 191 determines the value of an error counter variable which is provided for each representative point for determining the region and indicates the degree of difference between that representative point and the sample ξ, based on the distance between the sample ξ and that representative point in the state space and the difference between the value calculated by applying the sample ξ to the partial function model and the value obtained based on the sample ξ, and determines the installation position of the new representative point in the state space on the basis of the value of the error counter variable.

According to the training device 100, it is possible to determine the installation position of a new representative point in consideration of not only the value of the state but also the value of the function to be trained, and in this respect, it is expected that the region can be set more appropriately.

Also, the region setting unit 191 divides the region when a predetermined condition for the age of an edge is satisfied. As described above, the age of an edge corresponds to an example of an index value based on the distance between the sample ξ and the representative point in the state space.

As a result, the region setting unit 191 can divide a region having a large number of classified samples ξ. This division allows the model-setting unit 194 to set functions (policy functions or value functions) in a detailed manner for portions of the state space where samples ξ are relatively concentrated.

Also, the partial function model associated with at least one region is a nonlinear model.

As a result, the training device 100 can reduce the possibility of overfitting. In addition, the training device 100 can obtain a piece-wise linear model, which makes it relatively easy to give meaning to training.

Also, the partial function model associated with at least one region is a nonlinear model.

Thereby, the training device 100 is expected to be able to train appropriately even when the function is complicated.

Also, the clustering unit 193 determines, when there is a model that is provided in each of a plurality of regions into which is divided a state space that includes a sample ξ that indicates a state about the control object 900 and representing an evaluation of the action of the control object 900 in response to control over the control object 900, the region that includes a given sample ξ. The training unit 195 evaluates the action of the control object 900 based on the sample and the model for the determined region.

According to the training device 100, training can be performed for each region into which the state space is divided, and in this respect, it is possible to more appropriately cope with environmental changes in reinforcement learning.

Figure 11:
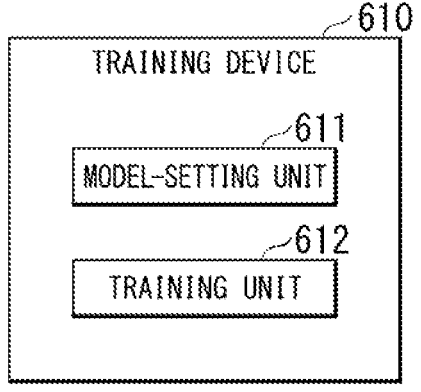
FIG. 11 is a diagram showing a configuration example of the training device according to the example embodiment.

FIG. 11 is a diagram illustrating a configuration example of the training device according to the example embodiment.

With the configuration shown in FIG. 11, the training device 610 includes a model-setting unit 611 and a training unit 612.

With such a configuration, the model-setting unit 611 updates a model for a region that includes a given sample on the basis of the sample, among a plurality of models provided for each region into which is divided a state space that includes a sample indicating a state about a control object and representing an evaluation of the action of the control object in response to control over the control object. The training unit 612 evaluates the action of the control object in a certain state based on the model for the region containing the sample indicating that state.

The model-setting unit 611 corresponds to an example of a model-setting means. The training unit 612 corresponds to an example of a training means.

According to the training device 610, training can be performed for each region obtained by dividing the state space, and in this respect, it is possible to more appropriately cope with environmental changes in reinforcement learning.

The model-setting unit 611 can be implemented using the functions of the model-setting unit 194 shown in FIG. 1, for example. The training unit 612 can be implemented using the functions of the training unit 195 shown in FIG. 1, for example.

Figure 12:
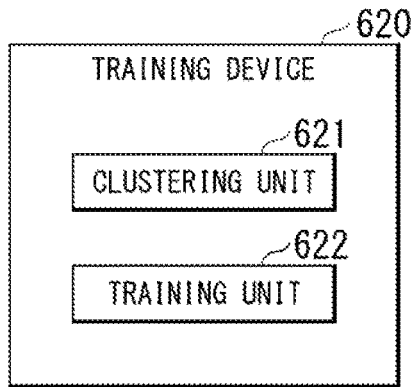
FIG. 12 is a diagram showing a configuration example of the training device according to the example embodiment.

FIG. 12 is a diagram illustrating another configuration example of the training device according to the example embodiment. With the configuration shown in FIG. 12, the training device 620 includes a clustering unit 621 and a training unit 622.

With such a configuration, when there is a model that is provided in each of a plurality of regions into which is divided a state space that includes a sample indicating a state about a control object and representing an evaluation of the action of the control object in response to control over the control object, the clustering unit 621 determines the region that includes a given sample. The training unit 622 evaluates the action of the control object on the basis of the sample and the model for the determined region.

The clustering unit 621 corresponds to an example of a clustering means. The training unit 622 corresponds to an example of a training means.

According to the training device 610, training can be performed for each region into which the state space is divided, and in this respect, it is possible to more appropriately cope with environmental changes in reinforcement learning.

The clustering unit 621 can be implemented using the functions of the clustering unit 193 shown in FIG. 1, for example. The training unit 612 can be implemented using the functions of the training unit 195 shown in FIG. 1, for example.

Figure 13:
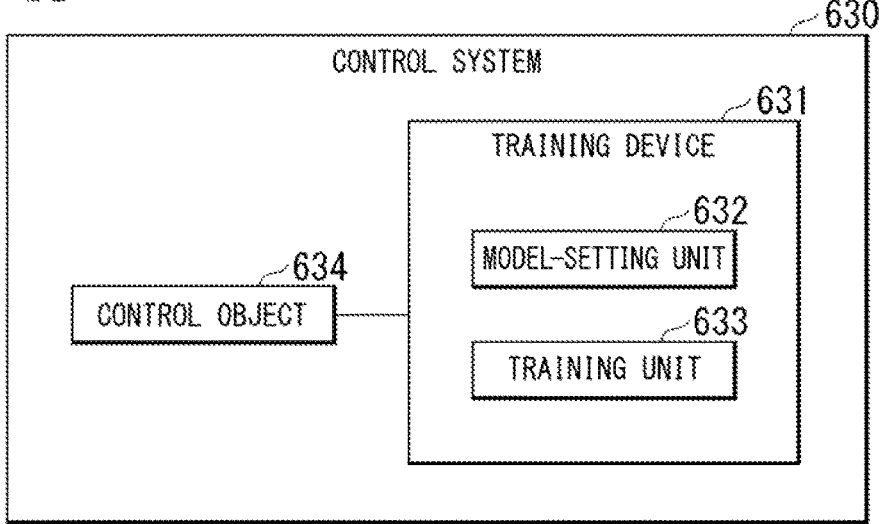
FIG. 13 is a diagram showing a configuration example of the control system according to the example embodiment.

FIG. 13 is a diagram illustrating a configuration example of the control system according to the example embodiment. With the configuration shown in FIG. 13, the control system 630 includes a training device 631 and a control object 634. The training device 631 includes a model-setting unit 632 and a training unit 633.

With such a configuration, the model-setting unit 632 updates a model for a region that includes a given sample on the basis of the sample, among a plurality of models provided for each region into which is divided a state space that includes a sample indicating a state about a control object 634 and representing an evaluation of the action of the control object 634 in response to control over the control object 634. The training unit 633 evaluates the action of the control object 634 in a certain state based on the model for the region containing the sample indicating that state.

The model-setting unit 632 corresponds to an example of a model-setting means. The training unit 633 corresponds to an example of a training means.

According to the control system 630, training can be performed for each region obtained by dividing the state space, and in this respect, it is possible to more appropriately cope with environmental changes in reinforcement learning.

The model-setting unit 632 can be implemented using the functions of the model-setting unit 194 shown in FIG. 1, for example. The training unit 633 can be implemented using the functions of the training unit 195 shown in FIG. 1, for example. The control object 634 can be implemented, for example, using the functions of the control object 900 shown in FIG. 1.

Figure 14:
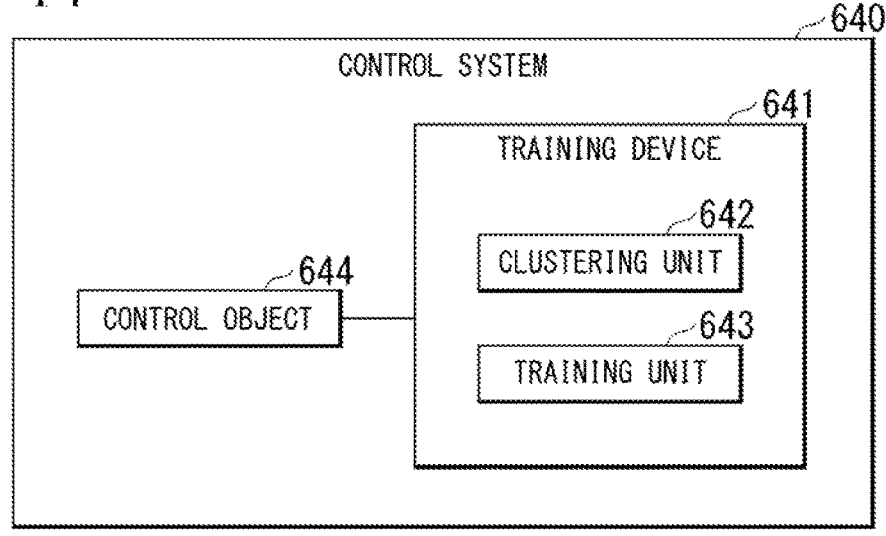
FIG. 14 is a diagram showing a configuration example of the control system according to the example embodiment.

FIG. 14 is a diagram illustrating a configuration example of the control system according to the example embodiment. With the configuration shown in FIG. 14, the control system 640 includes a training device 641 and a control object 644. The training device 641 includes a clustering unit 642 and a training unit 643.

With such a configuration, when there is a model that is provided in each of a plurality of regions into which is divided a state space that includes a sample indicating a state about the control object 644 and representing an evaluation of the action of the control object 644 in response to control over the control object 644, the clustering unit 642 determines the region that includes a given sample. The training unit 643 evaluates the action of the control object 644 based on the sample and the model for the determined region.

The clustering unit 642 corresponds to an example of a clustering means. The training unit 643 corresponds to an example of a training means.

According to the control system 640, training can be performed for each region obtained by division of the state space, and in this respect, it is possible to more appropriately cope with environmental changes in reinforcement learning.

The clustering unit 642 can be implemented using the functions of the clustering unit 193 shown in FIG. 1, for example. The training unit 643 can be implemented using the functions of the training unit 195 shown in FIG. 1, for example. The control object 644 can be implemented, for example, using the functions of the control object 900 shown in FIG. 1.

Figure 15:
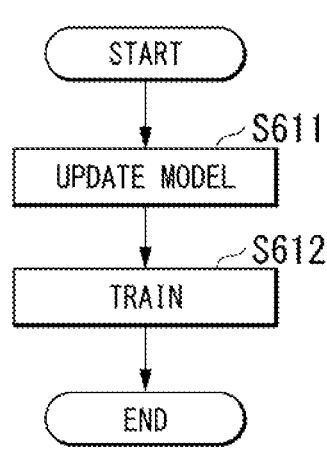
FIG. 15 is a diagram showing an example of the processing procedure in the training method according to the example embodiment.

FIG. 15 is a diagram showing an example of the processing procedure in the training method according to the example embodiment. The training method shown in FIG. 15 includes updating a model (Step S611) and training (Step S612).

In updating a model (Step S611), a model for a region that includes a given sample is updated on the basis of the sample, among a plurality of models provided for each region into which is divided a state space that includes a sample indicating a state about a control object and representing an evaluation of the action of the control object in response to control over the control object. In training (Step S612), the action of the control object in a certain state is evaluated based on the model for the region including the sample indicating that state.

According to the processing of FIG. 15, training can be performed for each region obtained by dividing the state space, and in this respect, it is possible to more appropriately cope with environmental changes in reinforcement learning.

Figure 16:
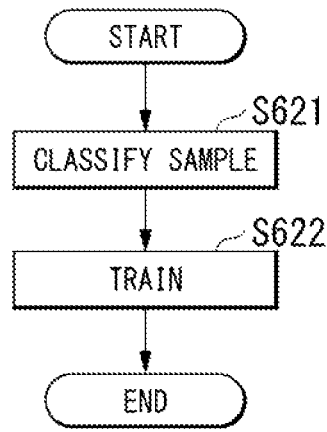
FIG. 16 is a diagram showing an example of the processing procedure in the training method according to the example embodiment.

FIG. 16 is a diagram showing another example of the processing procedure in the training method according to the example embodiment. The training method shown in FIG. 16 includes classifying samples (Step S621) and performing training (Step S622).

In classifying samples (Step S621), when there is a plurality of models provided for each region into which is divided a state space that includes a sample indicating a state about a control object and representing an evaluation of the action of the control object in response to control over the control object, for the action of the control object in a certain state, the region containing a sample indicating that state is determined. In training (Step S622), the action of the control object is evaluated on the basis of the model for the determined region.

According to the processing of FIG. 16, training can be performed for each region obtained by dividing the state space, and in this respect, it is possible to more appropriately cope with environmental changes in reinforcement learning.

Figure 17:
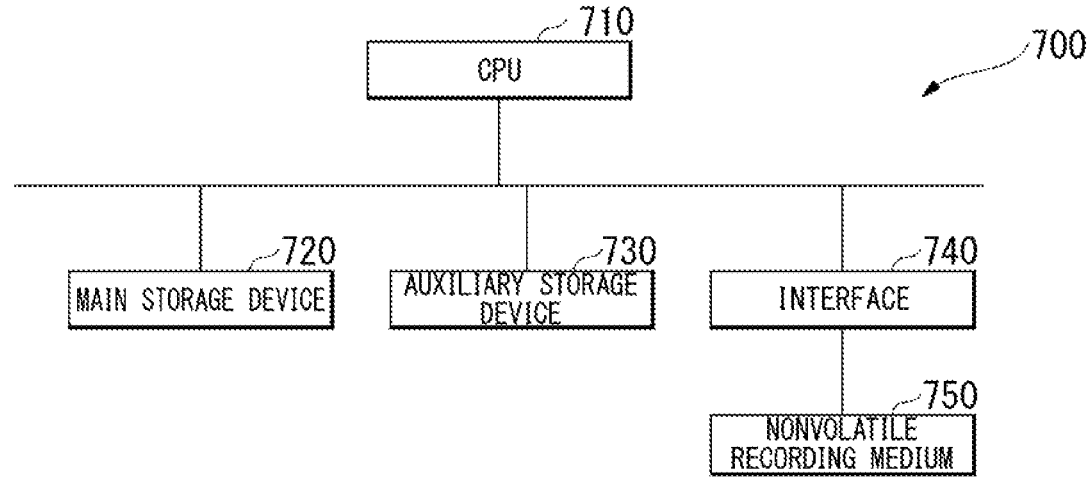
FIG. 17 is a schematic block diagram showing the configuration of a computer according to at least one example embodiment.

FIG. 17 is a schematic block diagram showing the configuration of a computer according to at least one example embodiment.

With the configuration shown in FIG. 17, a computer 700 includes a CPU 710, a main storage device 720, an auxiliary storage device 730, an interface 740, and a nonvolatile recording medium 750.

One or more of the training device 100, the training device 610, the training device 620, the training device 631, and the training device 641 or a part thereof may be implemented in the computer 700. In that case, the operation of each processing unit described above is stored in the auxiliary storage device 730 in the form of a program. The CPU 710 reads out the program from the auxiliary storage device 730, deploys the program in the main storage device 720, and executes the above processing according to the program. In addition, the CPU 710 reserves storage areas corresponding to the storage units described above in the main storage device 720 according to the program. Communication between each device and another device is performed by the interface 740 having a communication function and performing communication under the control of the CPU 710. The interface 740 also has a port for the nonvolatile recording medium 750 and thereby reads information from the nonvolatile recording medium 750 and writes information to the nonvolatile recording medium 750.

When the training device 100 is implemented in computer 700, the control unit 190 and the operation of each unit thereof are stored in the auxiliary storage device 730 in the form of programs. The CPU 710 reads out the program from the auxiliary storage device 730, deploys the program in the main storage device 720, and executes the above processing according to the program.

In addition, the CPU 710 reserves storage areas corresponding to the storage unit 180 in the main storage device 720 according to the program.

Communication with another device by the communication unit 110 is performed by the interface 740 having a communication function and operating under the control of the CPU 710.

Interaction between the training device 100 and the user is executed by the interface 740 having an input device and an output device, presenting information to the user through the output device under the control of the CPU 710, and accepting user operations through the input device.

When the training device 610 is implemented in computer 700, the operations of the model-setting unit 611 and the training unit 612 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for the processing performed by the training device 610 according to the program.

Communication between the training device 610 and other devices is performed by the interface 740 having a communication function and operating under the control of the CPU 710.

Interaction between the training device 610 and the user is executed by the interface 740 having an input device and an output device, presenting information to the user through the output device under the control of the CPU 710, and accepting user operations through the input device.

When the training device 620 is implemented in the computer 700, the operations of the clustering unit 621 and the training unit 622 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for the processing performed by the training device 620 according to the program.

Communication between the training device 620 and other devices is performed by the interface 740 having a communication function and operating under the control of the CPU 710.

Interaction between the training device 620 and the user is executed by the interface 740 having an input device and an output device, presenting information to the user through the output device under the control of the CPU 710, and accepting user operations through the input device.

When the training device 631 is implemented in the computer 700, the operations of the model-setting unit 632 and the training unit 633 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for the processing performed by the training device 631 according to the program.

Communication between the training device 631 and other devices is performed by the interface 740 having a communication function and operating under the control of the CPU 710.

Interaction between the training device 631 and the user is executed by the interface 740 having an input device and an output device, presenting information to the user through the output device under the control of the CPU 710, and accepting user operations through the input device.

When the training device 641 is implemented in the computer 700, the operations of the clustering unit 642 and the training unit 643 are stored in the auxiliary storage device 730 in the form of programs. The CPU 710 reads out the program from the auxiliary storage device 730, deploys the program in the main storage device 720, and executes the above processing according to the program.

In addition, the CPU 710 reserves a storage area in the main storage device 720 for the processing performed by the training device 641 according to the program.

Communication between the training device 641 and other devices is performed by the interface 740 having a communication function and operating under the control of the CPU 710.

Interaction between the training device 641 and the user is executed by the interface 740 having an input device and an output device, presenting information to the user through the output device under the control of the CPU 710, and accepting user operations through the input device.

Any one or more of the programs described above may be recorded in the nonvolatile recording medium 750. In this case, the interface 740 may read the program from the nonvolatile recording medium 750. Then, the CPU 710 may directly execute the program read by the interface 740, or execute the program after being temporarily stored in the main storage device 720 or the auxiliary storage device 730.

A program for executing all or part of the processing performed by the training device 100, the training device 610, the training device 620, the training device 631, and the training device 641 may be recorded on a computer-readable recording medium, and the program recorded on this recording medium may be read into a computer system and executed, whereby the processing of each unit may be performed. It should be noted that the "computer system" referred to here includes an OS (operating system) and hardware such as peripheral devices.

In addition, the "computer-readable recording medium" refers to portable media such as flexible discs, magneto-optical discs, ROM (Read Only Memory), CD-ROM (Compact Disc Read Only Memory), and storage devices such as hard disks built into computer systems. Further, the program may be for realizing some of the functions described above, or may be capable of realizing the functions described above in combination with a program already recorded in the computer system.

Although example embodiments of the present invention have been described in detail with reference to the drawings, the specific configuration is not limited to these example embodiments, and designs and the like are included within the scope of the gist of the present invention.

Some or all of the above-described example embodiments can also be described as in the following supplementary notes, but are not limited thereto.

(Supplementary Note 1)

A training device comprising:

a model-setting means that updates, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and a training means that evaluates an action of the control object in a given state, based on a model for a region that includes a sample indicating the state.

(Supplementary Note 2)

The training device according to supplementary note 1, further comprising:

a clustering means that determines which of the regions in the state space the sample is included in.

(Supplementary Note 3)

The training device according to supplementary note 1 or supplementary note 2, further comprising:

a region setting means that updates the region based on the sample.

(Supplementary Note 4)

The training device according to supplementary note 3, wherein the region setting means updates the region based on a Mahalanobis distance between the sample in the state space and a representative point for determining the region.

(Supplementary Note 5)

The training device according to any one of supplementary notes 2 to 4, wherein the region setting means updates division of the regions based on a difference between a value calculated by applying the sample to the model and a value obtained based on the sample.

(Supplementary Note 6)

The training device according to any one of supplementary notes 2 to 5, wherein the region setting means determines a value of an error counter variable which is provided for each representative point for determining the region and indicates a degree of difference between that representative point and the sample, based on a distance between the sample in the state space and the representative point and a difference between a value calculated by applying the sample to the model and the value obtained based on the sample, and determines an installation position of a new representative point in the state space based on the value of the error counter variable.

(Supplementary Note 7)

The training device according to any one of supplementary notes 1 to 6, wherein the region setting means divides the region when an index value based on the distance between the sample in the state space and a representative point for determining the region satisfies a predetermined condition.

(Supplementary Note 8)

The training device according to any one of supplementary notes 1 to 7, wherein the model associated with at least one of the regions is a linear model.

(Supplementary Note 9)

The training device according to any one of supplementary notes 1 to 8, wherein the model associated with at least one of the regions is a nonlinear model.

(Supplementary Note 10)

A training device comprising:

a clustering means that determines a region that includes a given sample when there is a model that is provided in each of a plurality of regions obtained by dividing a state space that includes a sample indicating a state about a control object and that represents an evaluation of an action of the control object in response to control over the control object; and a training means that evaluates the action based on the sample and the model for the determined region.

(Supplementary Note 11)

A control system comprising:

a training device and a control object, wherein the training device comprises:

a model-setting means that updates, among a plurality of models, a model for a region that includes a given sample based on the sample, the plurality of models being provided for each region obtained by dividing a state space that includes a sample indicates a state about the control object and the plurality of models representing an evaluation of an action of the control object in response to control over the control object; and a training means that evaluates an action of the control object in a given state, based on a model for a region that includes a sample indicating the state.

(Supplementary Note 12)

A control system comprising:

a training device and a control object, wherein the training device comprises:

a clustering means that determines a region that includes a given sample when there is a model that is provided in each of a plurality of regions obtained by dividing a state space that includes a sample indicating a state about the control object and that represents an evaluation of an action of the control object in response to control over the control object; and a training means that evaluates the action based on the sample and the model for the determined region.

(Supplementary Note 13)

A training method comprising:

updating, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and evaluating an action of the control object in a given state, based on a model for a region that includes a sample indicating the state.

(Supplementary Note 14)

A training method comprising:

determining a region that includes a given sample when there are plurality of models that are respectively provided in a plurality of regions obtained by dividing a state space that includes a sample indicating a state about a control object and that represent an evaluation of an action of the control object in response to control over the control object; and evaluating the action based on the sample and the model for the determined region.

(Supplementary Note 15)

A recording medium that records a program for causing a computer to execute:

updating, among a plurality of models, a model for a region that includes a given sample based on the sample, the plurality of models being provided for each region obtained by dividing a state space that includes a sample indicates a state about a control object and the plurality of models representing an evaluation of an action of the control object in response to control over the control object; and evaluating an action of the control object in a given state, based on a model for a region that includes a sample indicating the state.

(Supplementary Note 16)

A recording medium that records a program for causing a computer to execute:

determining a region that includes a given sample when there are plurality of models that are respectively provided in a plurality of regions obtained by dividing a state space that includes a sample indicating a state about a control object and that represent an evaluation of an action of the control object in response to control over the control object; and evaluating the action based on the sample and the model for the determined region.

INDUSTRIAL APPLICABILITY

The example embodiments of the present invention may be applied to a training device, a training method, a control system, and a recording medium.

DESCRIPTION OF REFERENCE SIGNS

10, 630, 640 Control system
100, 610, 620, 631, 641 Training device

110 Communication unit
180 Storage unit
190 Control unit
191 Region setting unit
192 Sample acquisition unit
193, 621, 642 Clustering unit
194, 611, 632 Model-setting unit
195, 612, 622, 633, 643 Training unit
196 Object control unit
900, 634, 644 Control object

What is claimed is:

1. A training device comprising:

a memory configured to store instructions; and a processor configured to execute the instructions to:

update, among a plurality of models, one model for one region based on one sample included in the one region, wherein a plurality of regions including the one region are obtained by dividing a state space, wherein each of the plurality of regions includes a sample indicating a state about a control object, wherein each of the plurality of models is provided for each of the plurality of regions, and wherein each of the plurality of models represents an evaluation of an action of the control object in response to control over the control object;

evaluate one action of the control object in one state indicated by the one sample based on the one model;

update the one region based on the one sample;

update division of the plurality of regions based on a difference between a value calculated by applying the one sample to the model and a value obtained based on the one sample; and control the control object based on the evaluation of the action of the control object in response to the control over the control object, wherein the control object is a vehicle, the state space corresponds to vehicle travel control, and the plurality of regions include a first state in which a road surface is dry and a second state in which the road surface is wet.

2. The training device according to claim 1, wherein the processor is configured to execute the instructions to determine whether or not the one sample is included in the one region among the plurality of regions in the state space.

3. The training device according to claim 1, wherein the processor is configured to execute the instructions to update the region based on a Mahalanobis distance between the one sample in the state space and a representative point for determining the region.

4. The training device according to claim 1, wherein the processor is configured to execute the instructions to determine a value of an error counter variable which is provided for each representative point for determining the region and indicates a degree of difference between each of the representative points and the one sample, based on a distance between the one sample in the state space and the representative point and a difference between a value calculated by applying the one sample to the model and the value obtained based on the one sample, and determines an installation position of a new representative point in the state space based on the value of the error counter variable.

5. The training device according to claim 1, wherein the processor is configured to execute the instructions to divide the region when an index value based on a distance between the one sample in the state space and a representative point for determining the region satisfies a predetermined condition.

6. The training device according to claim 1, wherein the model associated with at least one of the regions is a linear model.

7. The training device according to claim 1, wherein the model associated with at least one of the regions is a nonlinear model.

8. A control system comprising:

the training device according to claim 1; and the control object.

9. A training device comprising:

a memory configured to store instructions; and a processor configured to execute the instructions to:

determine a region that includes a given sample when there is a model that is provided in each of a plurality of regions obtained by dividing a state space that includes a sample indicating a state about a control object and the model represents an evaluation of an action of the control object in response to control over the control object;

evaluate the action based on the given sample and the model for the determined region;

update the region based on the sample;

update the division of the plurality of regions based on a difference between a value calculated by applying the given sample to the model and a value obtained based on the given sample: and control the control object based on the evaluation of the action of the control object in response to the control over the control object, wherein the control object is a vehicle, the state space corresponds to vehicle travel control, and the plurality of regions include a first state in which a road surface is dry and a second state in which the road surface is wet.

10. A control system comprising:

the training device according to claim 9; and the control object.

11. A training method comprising:

updating, among a plurality of models, one model for one region based on one sample included in the one region, wherein a plurality of regions including the one region are obtained by dividing a state space, wherein each of the plurality of regions includes a sample indicating a state about a control object, wherein each of the plurality of models is provided for each of the plurality of regions, and wherein each of the plurality of models represents an evaluation of an action of the control object in response to control over the control object;

evaluating one action of the control object in one state indicated by the one sample based on the one model;

updating the one region based on the one sample;

updating division of the plurality of regions based on a difference between a value calculated by applying the one sample to the model and a value obtained based on the one sample; and controlling the control object based on the evaluation of the action of the control object in response to the control over the control object, wherein the control object is a vehicle, the state space corresponds to vehicle travel control, and the plurality of regions include a first state in which a road surface is dry and a second state in which the road surface is wet.

\* \* \* \* \*